United States

[11] 3,619,030

| [72] | Inventors | Kaoru Tomii; Eiichi Miyazaki, both of Tokyo, Japan |
|---|---|---|
| [21] | Appl. No | 783,793 |
| [22] | Filed | Dec. 16, 1968 |
| [45] | Patented | Nov. 9, 1971 |
| [73] | Assignee | Matsushita Electric Industrial Co., Ltd. Osaka, Japan |
| [32] | Priorities | Dec. 28, 1967 |
| [33] | | Japan |
| [31] | | 43/88; Jan. 20, 1968, Japan, No. 43/3397 |

[54] FIBER OPTICS ELEMENT
2 Claims, 14 Drawing Figs.

[52] U.S. Cl. .................................... 350/96 B, 250/227, 313/92 LF, 355/1
[51] Int. Cl. ........................................ G02b 5/16
[50] Field of Search ........................... 350/96, 96 B; 313/92 LF; 250/227; 355/1

[56] References Cited
UNITED STATES PATENTS

| 2,877,368 | 3/1959 | Sheldon............... | 350/96 B X |
| 3,210,597 | 10/1965 | Siegmund et al. .............. | 350/96 B X |
| 3,313,940 | 4/1967 | Goodrich ..................... | 350/96 B UX |
| 3,449,036 | 6/1969 | Jacobsen ..................... | 350/96 B |
| 3,470,319 | 9/1969 | McGlamery.................. | 350/96 B UX |

*Primary Examiner*—David H. Rubin
*Attorney*—Stevens, Davis, Miller & Mosher

ABSTRACT: A fiber optics element comprising a pair of fiber optics assemblies connected in series, the side face of one assembly being transparent, and provided with a half mirror between said two assemblies at an oblique angle to the optical path, whereby the reflected image of an object disposed in close contact with the end face of said one assembly is derived from the side face thereof.

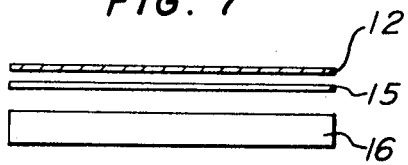
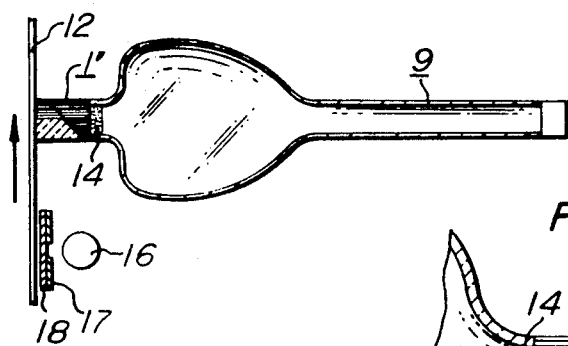
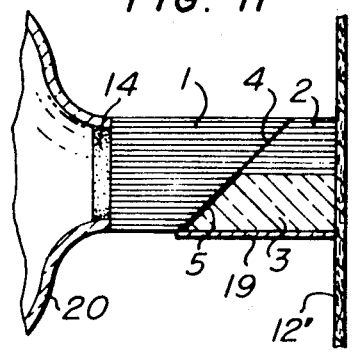
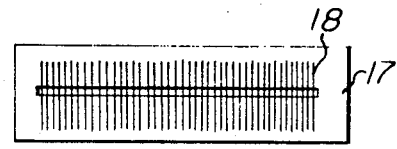

FIBER OPTICS ELEMENT

This invention relates to an optical fiber element and more particularly to an optical fiber element wherein light rays are introduced from one end of the element and recording is achieved on a recording medium disposed in close contact to the other end or the reflection image of an object disposed in close contact with the other end is directly taken out.

The object of this invention is to provide a fiber optics element comprising a pair of assemblies of optical fibers connected lengthwise with a partial mirror disposed therebetween and with a reflection film for optically separating the incident side and the output side, at least one side face of at least one assembly having a transparent portion whereby the reflected light image of an object closely disposed on one end face of the element can be read out with a high resolution and further scattered light rays from the incident points do not mix into the output light to improve the characteristic of the output light image.

A further object of this invention is to provide a fiber optics cathode-ray tube for optically recording and reading out utilizing a fiber optics element as described above.

A yet further object of this invention is to supply means for compensating the transmission irregularity of the fibers of a fiber optics element as described above.

Another object of the present invention is to provide a fiber optics element comprising a pair of fiber optics assemblies with a half mirror disposed therebetween, at least one side face of one of said assemblies being transparent, whereby the image of an object disposed on one end face of the element can be derived from said side face.

The present invention will be explained in more detail with reference to the accompanying drawings in which:

FIG. 7 is a partial elevational view of a part of FIG. 6;

FIG. 8 is a longitudinal cross section of a cathode ray tube embodying another means for compensating the transmission irregularity of fibers;

FIG. 9 is a partial elevation view of a part of FIG. 8;

FIG. 10 is a side view of a neutral density filter; and

FIG. 11 is a partial side section of a yet another cathode-ray tube embodying another means for compensating the transmission irregularity of fibers.

Figure 1A:
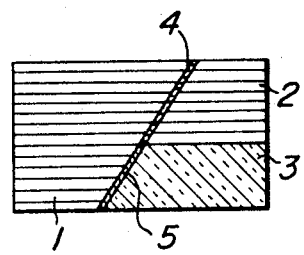
FIGS. 1A and 1B are a longitudinal and a lateral cross section of a fiber optics element embodying the present invention, respectively.

An embodiment of a fiber optics element according to this invention will be explained referring to FIGS. 1A and 1B in which a fiber optics assembly or bundle 1 of optical fibers of a diameter not greater than 25 μm. is connected to the other assembly or bundle 2 of optical fibers of a similar diameter and to a transparent glass 3 through a half mirror 4 and a reflection film 5 disposed at an angle of about 45° with respect to the common optical path. The reflection film 5 has 100 percent reflectivity.

Each fiber constituting the bundle 1 comprises a core made of a transparent material of high refractivity, a sheath made of a material of low refractivity and covering the core and an outer coating of light absorbing material, while each fiber constituting the bundle 2 comprises a core of high refractivity and a sheath of low refractivity covering the core.

When incident light rays enter the bundle of optical fibers 1, they are subjected to a loss of about 50 percent at the half mirror 4 but the remainder rays of about 50 percent go into the bundle of optical fibers 2 and strike an object disposed on the end face of the bundle 2. Light rays reflected from the object according to the reflectivity of the object propagate reversely in almost the same path and are subjected to a reflection by the half mirror 4, then they are directed to pass through the transparent glass 3 to be derived from the side face of the element as the output light rays.

Here, the perfect reflection film 5 serves to direct part of the scattered light rays reflected by the object and going back to the bundle of fibers 1 to the output side as well as shielding surplus rays scattered from the incident points.

Figure 1B:
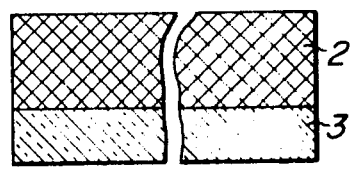
Figure 2A:
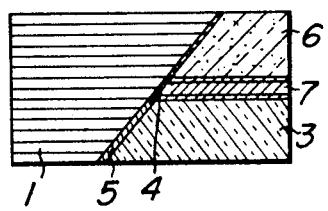
FIGS. 2A and 2B are a longitudinal and a lateral cross section of another embodiment of a fiber optics element according to the present invention.
Figure 2B:
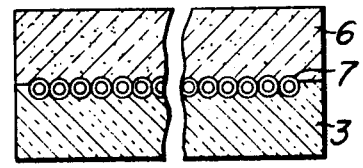

FIGS. 2A and 2B show another embodiment of a fiber optics element according to this invention. Description will be made of those portions which are different from those of the embodiment shown in FIGS. 1A and 1B. Reference numeral 6 represents a light absorber and 7 represents a row of optical fibers aligned coplanar and comprising a core of a high refractivity material having a diameter of about 100 μm. and a sheath of a low refractivity material covering the core. The cross section of the optical fibers may be formed in a circular, elliptical, or rectangular shape.

The function of the fiber optics element of FIGS. 2A and 2B is similar to that of FIGS. 1A and 1B.

Figure 3A:
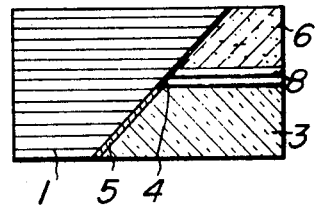
FIGS. 3A and 3B are a longitudinal and a lateral cross section of yet another embodiment of a fiber optics element according to the present invention.
Figure 3B:
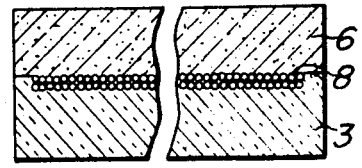

FIGS. 3A and 3B show another embodiment of the fiber optics element wherein several rows of optical fibers 8 having a diameter not greater than 25 μm. and made similar to those fibers 7 of FIGS. 2A and 2B are superposed vertically.

Figure 4:
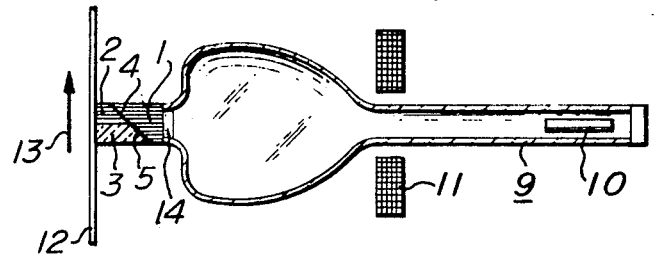
FIG. 4 is a schematic-sectional side view of a fiber optics cathode-ray tube utilizing a fiber optics element such as the one of FIGS. 1A and 1B.

FIG. 4 shows a fiber optics cathode-ray tube utilizing a fiber optics element as described above, in which an electron beam emitted from an electron gun 10 performs one dimensional scan on a faceplate comprising a fiber optics element by a deflection coil 11. On the inner end face of the fiber optics element, there is coated a phosphor layer 14 and on the other end face of the fiber optics element there is disposed a recording medium 12 in close contact with the end face of the element or the front face of the cathode-ray tube. When an electron beam modulated according to a video signal strikes the phosphor, light rays are emitted from the phosphor and pass through optical fibers 1 and 2 to record a certain pattern on the recording medium 12. The medium 12 is mechanically and continuously moved vertically as shown by an arrow 13, thus recording is done in two dimensions.

Alternatively, a document 12' (not shown) may be placed instead of the recording medium 12. In this case, light rays propagated in the fibers 2 adjacent to the transparent glass 3 impinge the document 12' and are reflected to reversely propagate through the fibers 2. These reflected rays are than reflected by a half mirror 4 and oriented to emit through a glass 3 and then to be received by a photoelectrical converter (not shown) which transforms the light rays reflected from the document into an electrical signal.

As stated above, a fiber optics cathode-ray tube according to this invention can be used for recording and for reading out or transmission.

Figure 5:
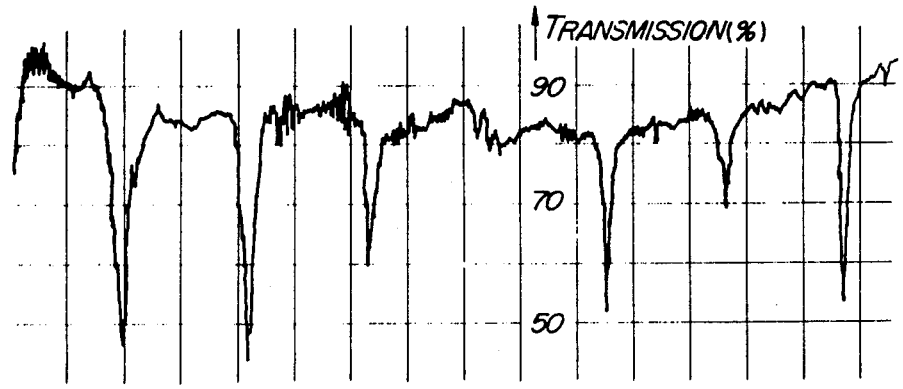
FIG. 5 is a graph showing the transmission irregularity of the fibers of a fiber optics element.

Practically, when a fiber plate is scanned with a light beam of about 100 μm. Φ, it is found that there exists a considerable irregularity in the transparency or the transmission of light as shown in FIG. 5. When such fiber plate is used without any compensation, even a uniformly white image to be recorded will produce a patterned image on a recording paper in accordance with the transmission irregularity as shown in FIG. 5.

This invention is also directed to a recording device in which such transmission irregularity as above-described can be compensated to perform a good recording and embodiments will be explained hereinafter.

Figure 6:
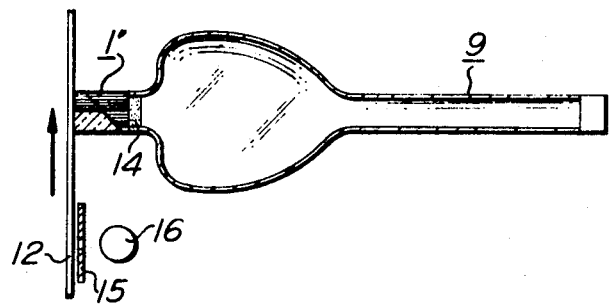
FIG. 6 is a longitudinal cross section of a cathode-ray tube embodying a means for compensating the transmission irregularity of the fibers according to the present invention.

In FIGS. 6 and 7, 9 indicates a fiber optics cathode-ray tube having a fiber plate 1' at the face plate, and 12 a photosensitive recording paper assumed to be driven in the direction of the arrow.

In this device, the horizontal scan is performed by scanning an electron beam in a direction perpendicular to the plane of the drawing and the vertical scan is performed by the shift of the recording paper 12 in the direction shown by the arrow.

The recording paper 12 is first exposed to the light rays from a source 16 transmitted through the fiber plate 1' are photographed. Thus, a complementary optical image to the transmission irregularity in FIG. 5 is previously given to the recording paper 12. When thereafter an optical image of interest is recorded on the paper 12 through the fiber plate 1' which plate has the transmission irregularity, the transmission irregularity is cancelled out by the optical image previously given through the negative film 15 and a good image without transmission irregularity can thus be recorded.

As this film 15, a silver salt film, a photographic film known under the trademark of Kalvar available from Kalvar Corp. or a photochromic film may be used. FIGS. 8 and 9 show another embodiment of compensating means, providing in front of a recording medium 12, an assembly of plate 17 having a slit the dimension of which corresponds to the line width of scanning and neutral-density filters 18 one of which is shown in FIG. 10 attached to the plate 17, the number of said filters is the same as that of the optical fibers in a fiber plate 1', and the transmission distribution of said filters is arranged to correspond to the transmission irregularities of the fiber plate 1'. The recording medium 12 is previously exposed to the light rays transmitted through the assembly which will compensate the transmission irregularity, and this is similar to the embodiment shown in FIG. 6.

FIG. 11 shows a cathode-ray tube for reading out an object picture closely disposed on the faceplate of the cathode-ray tube having a fiber optics element at the face portion. In the figure, 20 indicates the envelope of a tube utilizing a fiber optics element at the faceplate portion. A phosphor layer 14 is provided on the inner end face of the element. In the optical path of the fiber optics element, a half mirror 4 is provided to direct the light rays reflected from a document or picture 12' to the side face of the element. When light rays are emitted from the phosphor layer by scanning, they propagate through the half mirror 4 to strike the object 12' and then are reflected according to the reflectivity of the image of the object. Reflected light rays are further reflected by the half mirror 4 toward a photoelectrical converter through an exit aperture, which converter transforms the light rays to an electrical signal to read out the characters or figures on the object 12'. Here, a negative film or a neutral-density filter is provided at the front face of the exit aperture as indicated by numeral 19 to compensate the transmission irregularity of the fibers as described above.

What is claimed is:

1. A fiber optics assembly comprising first and second fiber optics bundles joined along an interface extending at an angle of 45° to the aligned optical axes of the fibers in each bundle, said second fiber optics bundle being in the form of a thin band extending laterally along the center portion of said first fiber bundle at said interface and with the individual fibers of both said bundles aligned at said interface, a transparent block member and a light-absorbing block member attached to opposite sides of said second fiber optics bundle and extending to said interface, whereby the cross-sectional dimension of said second fiber optics bundle and attached block members is substantially the same as the cross section of said first fiber optics bundle, a thin mirror element disposed at said interface, the portion of said mirror element aligned with said second fiber optics bundle being semireflective and the portion aligned with said transparent block member being fully reflective, and the remote ends of said first fiber optics bundle and said second fiber optics bundle and attached block members being substantially parallel and at substantially right angles to the optical axes of the fibers in each bundle, whereby image rays reflected from a film being scanned at the remote end of said second fiber optics bundle by illuminating rays from the remote end of said first fiber optics bundle are reflected by said interface mirror laterally through said transparent block member to external image-receiving means disposed at the side of said transparent block member.

2. A fiber optics assembly according to claim 1, wherein a compensating film is disposed on the external side surface of said transparent block member, said film having a varying pattern of transparency to compensate for the inherent nonuniformity of light transmission through said fiber optics bundles.

* * * * *